United States Patent
Villers et al.

(10) Patent No.: US 6,941,727 B2
(45) Date of Patent: Sep. 13, 2005

(54) METHOD AND SYSTEM FOR TRANSPORTING AND STORING COMMODITIES

(75) Inventors: Philippe Villers, Concord, MA (US); Tom De Bruin, Kibbutz HaOgen (IL); Shlomo Navarro, Holon (IL)

(73) Assignees: GrainPro, Inc., Concord, MA (US); The State of Israel-Ministry of Agriculture & Rural Development, Beit-Dagan (IL)

( * ) Notice: Subject to any disclaimer, the term of this patent is extended or adjusted under 35 U.S.C. 154(b) by 0 days.

(21) Appl. No.: 10/416,535

(22) PCT Filed: Nov. 26, 2001

(86) PCT No.: PCT/US01/44213

§ 371 (c)(1), (2), (4) Date: May 28, 2003

(87) PCT Pub. No.: WO02/44058

PCT Pub. Date: Jun. 6, 2002

(65) Prior Publication Data

US 2004/0031240 A1 Feb. 19, 2004

Related U.S. Application Data

(60) Provisional application No. 60/253,870, filed on Nov. 29, 2000.

(51) Int. Cl.[7] .............................................. B65B 31/00
(52) U.S. Cl. ............................. 53/434; 53/432; 53/443; 53/511; 53/512
(58) Field of Search .......................... 53/434, 432, 443, 53/510, 511, 512; 206/386, 597, 335; 220/1.5, 1.6

(56) References Cited

U.S. PATENT DOCUMENTS

| | | | | |
|---|---|---|---|---|
| 2,038,064 A | | 4/1936 | Stetson | |
| 2,124,412 A | | 7/1938 | Dodge | |
| 2,913,029 A | * | 11/1959 | Paton | 220/9.2 |
| 3,521,806 A | * | 7/1970 | Esty | 229/117.3 |
| 3,813,467 A | * | 5/1974 | Drain | 426/393 |

(Continued)

FOREIGN PATENT DOCUMENTS

| | | |
|---|---|---|
| DE | 3209930 | 9/1983 |
| DE | 3832390 | 4/1990 |
| EP | 0 242 183 | 10/1987 |
| EP | 1145640 | 10/2001 |
| FR | 2611669 | 9/1988 |

(Continued)

*Primary Examiner*—Stephen F. Gerrity
*Assistant Examiner*—Brian Nash
(74) *Attorney, Agent, or Firm*—G. E. Ehrlich (1995) Ltd.

(57) ABSTRACT

A method and a system of transporting a commodity includes the step of placing the commodity in a flexible hermetic container. The commodity is stored in the flexible hermetic container for at least a specific time period. The commodity is then moved from the flexible hermetic container to a shipping container having an insect barrier liner. The commodity is transported in the shipping container. The specific time period is a sufficient time period to kill substantially all of the insects that have infested the commodity prior to placement in the flexible hermetic container. In one embodiment, a vacuum is drawn on the flexible hermetic container to reduce the specific time period and an optional small amount of pesticide can be injected into the flexible hermetic container to which a vacuum has been applied to further reduce the specific time period. An inert gas is used to reduce the specific time period.

30 Claims, 7 Drawing Sheets

U.S. PATENT DOCUMENTS

| | | | | |
|---|---|---|---|---|
| 3,914,917 A | * | 10/1975 | Young | 53/434 |
| 3,983,258 A | * | 9/1976 | Weaver | 426/307 |
| 4,052,931 A | | 10/1977 | Morse et al. | |
| 4,055,931 A | * | 11/1977 | Myers | 53/408 |
| 4,186,845 A | | 2/1980 | Podd | |
| 4,224,732 A | | 9/1980 | Lloyd et al. | |
| 4,366,179 A | | 12/1982 | Nawata et al. | |
| 4,515,266 A | * | 5/1985 | Myers | 206/205 |
| 4,683,702 A | | 8/1987 | Vis | |
| 4,734,292 A | | 3/1988 | Gerardus Van Boxtel | |
| 4,899,517 A | | 2/1990 | Shima et al. | |
| 4,966,796 A | | 10/1990 | Aki et al. | |
| 4,981,007 A | | 1/1991 | Shima et al. | |
| 5,161,693 A | * | 11/1992 | Friman | 206/597 |
| 5,222,621 A | | 6/1993 | Matias | |
| 5,279,537 A | | 1/1994 | Lile | |
| 5,296,253 A | * | 3/1994 | Lusas et al. | 426/629 |
| 5,330,047 A | | 7/1994 | Gouge et al. | |
| 5,332,547 A | | 7/1994 | Olson et al. | |
| 5,355,781 A | | 10/1994 | Liston et al. | |
| 5,403,609 A | * | 4/1995 | Subotics et al. | 426/524 |
| 5,427,807 A | | 6/1995 | Chum et al. | |
| 5,487,485 A | * | 1/1996 | Yang et al. | 220/1.6 |
| 5,489,037 A | | 2/1996 | Stopper | |
| 5,505,950 A | * | 4/1996 | Floyd et al. | 426/404 |
| 5,542,563 A | | 8/1996 | Matias | |
| 5,546,731 A | | 8/1996 | Wyslotsky | |
| 5,565,230 A | * | 10/1996 | Bailey | 426/411 |
| 5,619,841 A | * | 4/1997 | Muise et al. | 53/440 |
| 5,735,786 A | | 4/1998 | Krueger et al. | |
| 5,747,082 A | | 5/1998 | Floyd et al. | |
| 5,763,028 A | | 6/1998 | Matsumoto et al. | |
| 5,769,232 A | | 6/1998 | Cash et al. | |
| 5,791,150 A | * | 8/1998 | Bosher et al. | 62/62 |
| 5,794,408 A | | 8/1998 | Patouraux et al. | |
| 5,801,317 A | | 9/1998 | Liston et al. | |
| 5,871,148 A | | 2/1999 | Hafer et al. | |
| 5,881,881 A | | 3/1999 | Carrington | |
| 5,890,611 A | * | 4/1999 | Podd | 220/1.5 |
| 5,897,211 A | | 4/1999 | Hafer et al. | |
| 5,945,147 A | | 8/1999 | Borchard | |
| 6,054,153 A | | 4/2000 | Carr et al. | |
| 6,063,418 A | | 5/2000 | Sugimoto et al. | |
| 6,113,270 A | | 9/2000 | Hafer | |
| 6,123,969 A | | 9/2000 | Sjoberg | |
| 6,132,350 A | | 10/2000 | Krueger et al. | |
| 6,186,713 B1 | * | 2/2001 | Bonerb | 410/100 |
| 6,609,354 B1 | * | 8/2003 | Villers | 53/434 |

FOREIGN PATENT DOCUMENTS

| | | |
|---|---|---|
| FR | 2643231 | 8/1990 |
| FR | 2795055 | 12/2000 |
| GB | 1185926 | 3/1970 |
| IL | 87308 | 3/1996 |
| JP | 60149509 | 8/1985 |
| JP | 02268631 | 11/1990 |
| JP | 03162268 | 7/1991 |
| JP | 04087966 | 3/1992 |
| JP | 06090660 | 4/1994 |
| JP | 07284327 | 10/1995 |

* cited by examiner

FIG. 8

METHOD AND SYSTEM FOR TRANSPORTING AND STORING COMMODITIES

RELATED APPLICATION

This application claims the benefit of U.S. Provisional Application No. 60/253,870, filed on Nov. 29, 2000. The entire teachings of the aforementioned application are incorporated herein by reference.

BACKGROUND OF THE INVENTION

For a large variety of agricultural and non-agricultural commodities, such as cocoa, coffee, or grains such as wheat, corn, or rice, protected storage to avoid the direct and indirect effects of oxygen and excessive moisture (which effects include, but are not limited to, enabling insects, rodents, and fungi to flourish) on bulk or bagged stored commodities is required. It is recognized that when commodities are harvested there is a high likelihood that along with the harvested commodity, whether cereal grains, pulses, oilseeds, nuts, spices, or beverages like coffee and cocoa, insects may be contained within the commodity. Also, stored commodities are often subject to rodent attacks. If left untreated, the insect infestations can result in a rapid growth in the number of insects and destruction of the commodity. In addition, the existence of insect infestations in many instances necessitates fumigation, particularly when the commodities are shipped to foreign countries, in order to protect the recipient country from the spread of such insects, i.e., quarantine control treatments.

Typically upon harvest, the commodity is placed in jute bags and stored in large containers, such as sheds, warehouses, or silos. Agricalutural commodities after harvest are often subject to infestation by insects and, in some cases, are previously infested with insects that can consume or damage substantial amounts of the commodity. Further, the stored commodity is typically consumed by rodents resulting in further losses of the commodity.

One approach to prevent these losses is to use potentially dangerous pesticides, such as methyl bromide, on the commodity during storage and thereby released to the environment, or more typically, pesticides are added to the commodity immediately prior to or after shipping. However, the use of these pesticides is undesirable as some pesticides can have an adverse effect on the health of the consumer or the upper atmosphere.

SUMMARY OF THE INVENTION

This present invention relates to a method of storing and transporting a commodity. The steps include placing the commodity in a first flexible, rodent-resistant hermetic container. The commodity is stored in the first flexible hermetic container for at least a specific time period. The specific time period in one embodiment is a sufficient time period, at a temperature at which the commodity is stored, to kill substantially all of the insects that have infested the commodity prior to placement in the first flexible hermetic container. The next step includes moving the commodity in the flexible hermetic container to a substantially rodent-proof shipping container. At least one insect-proof barrier can be provided to protect the commodity within the shipping container. The commodity is then transported in the shipping container.

In one embodiment, a vacuum is drawn on the first flexible hermetic container to reduce the specific time period by removing substantially all of the air in the hermetic container. In another embodiment, the first flexible hermetic container can be purged with a gas other than air to reduce the amount of breathable air required to sustain life in an air breathing species to both reduce the specific time period to kill substantially all of the insects that have infested the commodity prior to placement in the flexible hermetic container and, in addition where required, to protect the commodity from oxidation. The purging gas can include carbon dioxide or nitrogen.

The commodity can be placed in a plurality of flexible bags prior to being placed in the first flexible hermetic container. The flexible bags can include jute, paper, or plastic bags.

In one embodiment, the insect barrier liner of the shipping container is an air-permeable insect barrier. The air-permeable insect barrier can be a cloth insect barrier, or a plastic film which can be impregnated with an insecticide or an insect repellant. In another embodiment, the liner of the container is a low air-permeable insect barrier.

To facilitate the loading of the commodity into the shipping container, air can be blown into the liner of the shipping container to keep the liner open, or other means can be used, including Velcro® strips and the like to hold the liner to the sides of the shipping container.

In one embodiment, the commodity is moved from the shipping container having an insect barrier liner to the first or different flexible hermetic container after being transported. The commodity is then stored in the flexible hermetic container.

A pesticide-free integrated transport and storage system for a commodity is also provided which includes at least one bag for receiving the commodity, a flexible hermetic container capable of storing the commodity in the bags for a specific period of time, a substantially rodent-proof rigid container defining a volume to receive the commodity, and at least one insect-proof barrier within the shipping container enclosing at least some of the commodity.

The barrier, in one embodiment, includes an air-permeable insect-proof barrier. In another embodiment, the barrier includes a low air-permeable insect-proof barrier.

In alternative embodiments, the commodity is loaded onto a plurality of skids or pallets. Each pallet carries a plurality of flexible bags with each bag containing commodity. In one embodiment, a flexible insect barrier low air-permeable container encircles the flexible bags of each pallet.

The invention provides an economically feasible, integrated system which provides both safe storage and safe transport without inefficient multiple loading and unloading processes. This enables stored commodities to be preserved from quality degradation, at the country of origin and where needed for extended storage at the recipient country, as well as during transportation, while also meeting quarantine requirements. The integrated system allows the efficient storage and transport without requiring unnecessary re-handling by solving the safe storage, transport, and quarantine or fumigation requirements where so required within an integrated, single-system context. The method and system provide a pesticide-free integrated transport and storage (PITS)™ system for agricultural commodities, such as cocoa, coffee, or cereal grains, such as wheat, corn, and rice, or spices, pulses, dry fruits or nuts.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
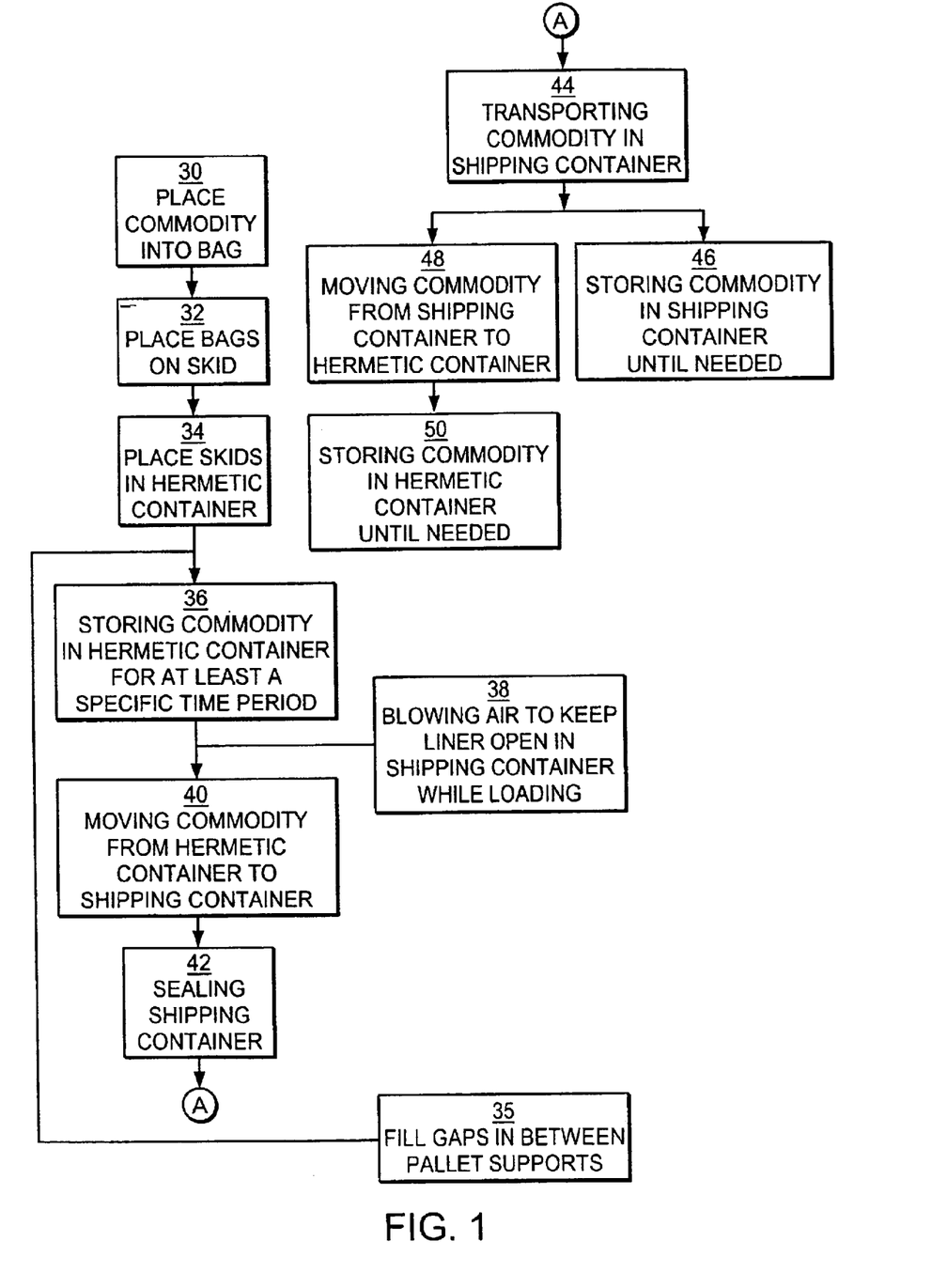
FIG. 1 is a flow chart of one embodiment of the invention.
Figure 2:
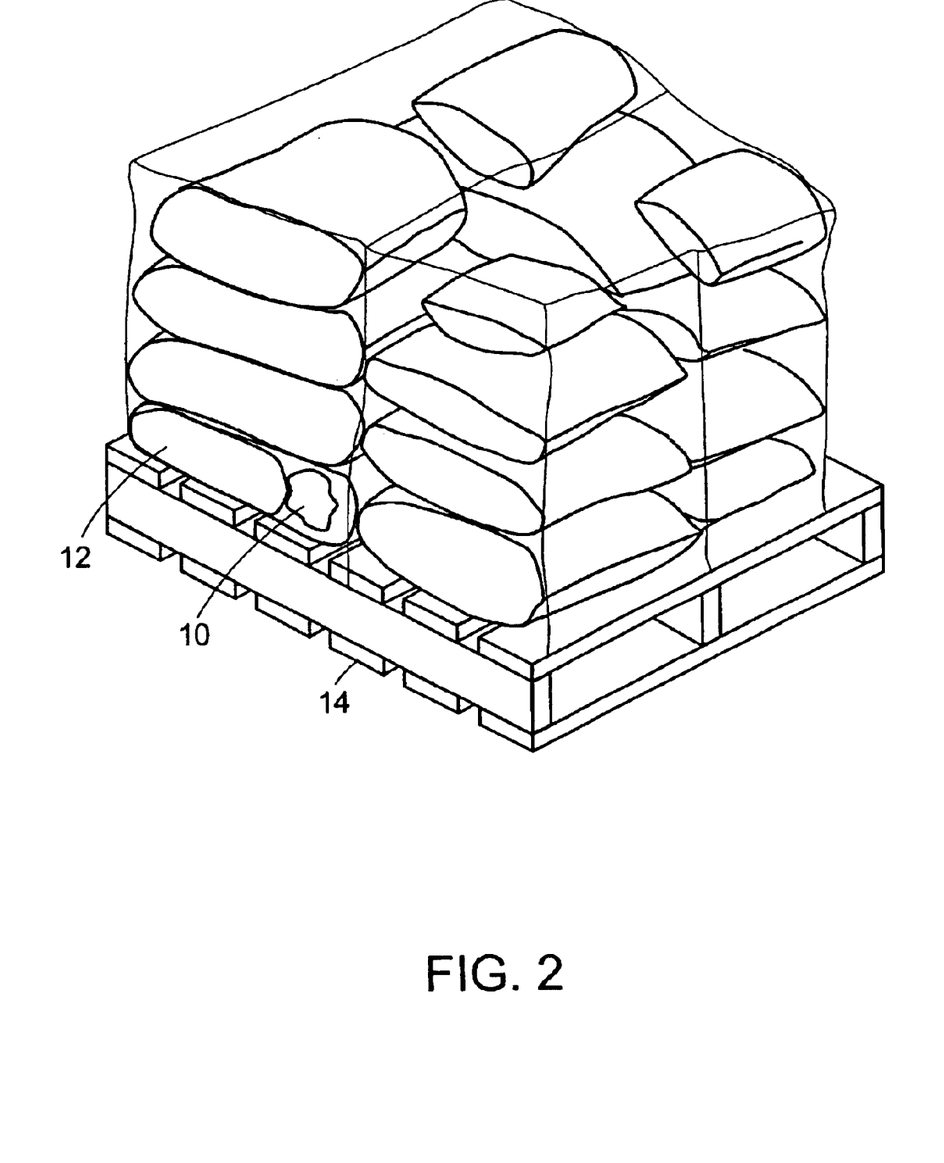
FIG. 2 is a perspective view of a plurality of bags of a commodity on a pallet.
Figure 3:
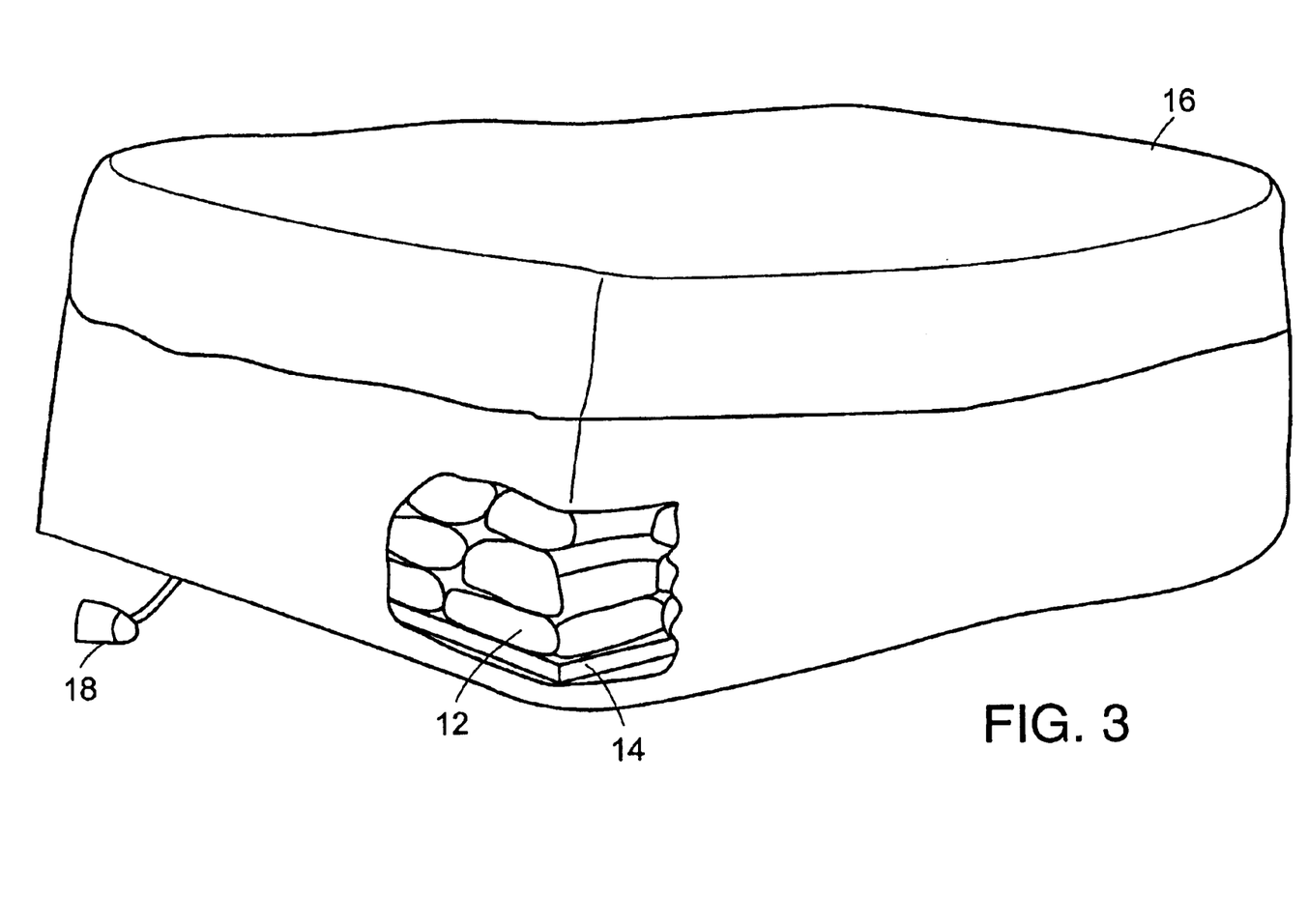
FIG. 3 is a hermetic container containing a plurality of pallets of jute bags.

A description of methods and system according to the invention follows. Referring to FIGS. 1–3, a method of storing and transporting a commodity 10 according to the invention is illustrated. In a locality generally in proximity to where the commodity 10 is produced, such as in a producing or exporting country, the commodity 10 is loaded in a conventional manner into standard flexible jute bags 12 (as seen in FIG. 3), or equivalent. The loading of the commodity 10 into the bags 12 is represented by box 30 in FIG. 1.

A plurality of the bags 12 are placed on a skid or pallet 14 as shown in FIG. 2 and represented by box 32 in FIG. 1. The skid 14 and the bags 12 of the commodity 10 which the skid 14 holds is moved into a flexible, hermetic container 16, such as a storage container marketed and sold under the trade name Cocoon™ by GrainPro, Inc. The Cocoon™ storage container is described in further detail in co-pending patent application Ser. No. 09/667,481, filed Sep. 22, 2000, the entire teachings of which are incorporated herein by reference. The placing of the bags 12 containing the commodity 10 into the hermetic container 16 is represented by box 34 in FIG. 1.

An alternative to lifting the skid 14 is to have a skid with casters or rollers such that the loaded skid can be manually rolled into the hermetic container 16. It is also recognized that other methods can be used to place the loaded skid 14 into the hermetic container, such as a loading dolly that is placed beneath the skid 14 prior to loading the skid 14 with bags 12. The loaded skid 14 then can be manually rolled into the hermetic container 16, even in the absence of a forklift or other vehicle. It is recognized that the loaded bags 12 can be loaded into the hermetic container 16 without the skids 14.

The bags 12 containing the commodity then are stored within the hermetic enclosures or container 16 for at least a specific minimum time, such as seven to ten days at room temperature, to kill many common insects. The storage of the loaded skid 14 in the hermetic container 16 is represented by box 36. The hermetic container 16, in addition to depriving the insects of air, allows the commodity to retain its quality, by reducing the direct and indirect adverse effects of moisture and oxygen, such as the growth of molds or fungi, oxidation effects, or significant changes in moisture within the commodity, and even condensation of moisture in the form of water.

In addition, hypoxicity (low oxygen level) permits storage of commodities at a higher moisture content than in a normal atmosphere. For example, milled rice can be stored long term, such as over six months, with a moisture content of 15.6% and minimum oxygen content (0.4%) and retain the rice's high-quality aroma and suitability for cooking. Typically, rice is stored in the producing country at a lower moisture content in order to limit insect and fungi development. This lower moisture, however, results in an adverse effect to taste and smell of the rice.

In one embodiment, the hermetic container 16 is a Cocoon™ storage container formed of a polyvinyl chloride (PVC) material having a thickness of at least 0.813 mm (0.032 inches). This low air-permeable container 16, in addition to depriving air to any insects within the commodity, is slippery and tough enough, when intentionally kept taut, to prevent rodent penetration, i.e., rodent-proof.

For faster and, in some cases, superior quality results, or more rapid and complete reduction in oxygen levels, a vacuum pump 18 (FIG. 3) is used to draw oxygen and other gases from the hermetic container 16, so that the commodity 10 is rendered substantially free of live insects in a shorter time period. For example, a hermetic container 16 in the range of 5 to 10 tons capacity is rendered free of live insects, which means that the commodity 10 contains no living insects (including adults, larvae, pupae, and eggs), after two or three days with ambient temperatures being at about 25° C. or higher, and, for most commonly occurring insects species found in stored products, when exposed to a vacuum of between about 25 mm Hg and 100 mm Hg, depending on the species. A 5 ton capacity container 16 is approximately 2.95 meters by 1.7 meters by 1.5 meters high in size when full in one embodiment. The 10 ton capacity container 16 is approximately 3.4 meters by 2.95 meters by 1.5 high in meters.

The vacuum pump, in one embodiment, includes a device to evaporate condensed vapors which can emerge from the stored commodity. For example, cocoa emits volatile acids. The size of the vacuum pump required depends on the size of the hermetic container, the volume of resident leaks in the container, and the desired time to reach the desired level of vacuum. For example, a three horsepower vacuum pump is capable of drawing a sufficient vacuum for hermetic containers 16 rated in the range of 5 to 10 ton capacities. The use of vacuum, when maintained, arrests moisture level fluctuations, oxidation, and other oxygen-related effects, thereby hindering growth of molds and fungi.

Figure 4:
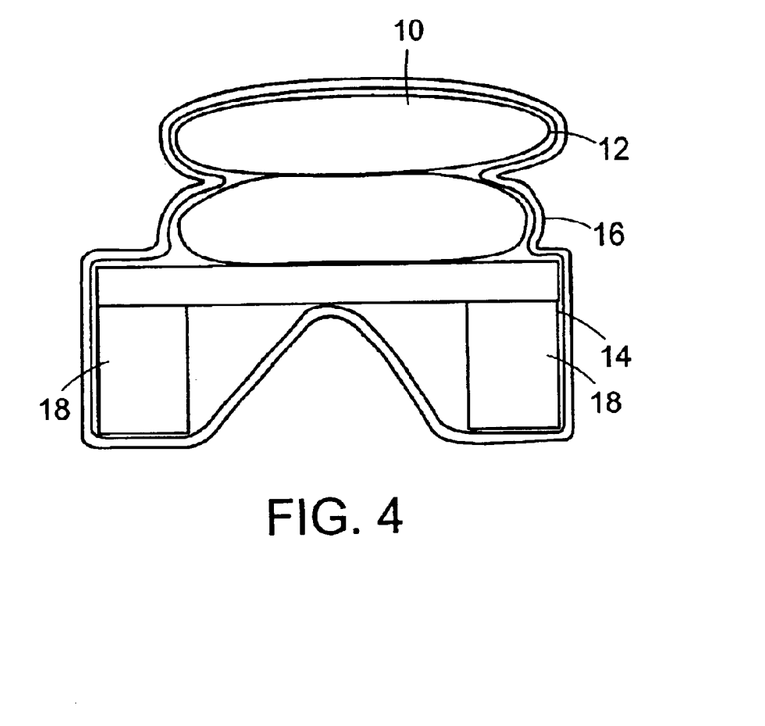
FIG. 4 is a cross-sectional view of a pallet having bags of commodity thereon.
Figure 5:
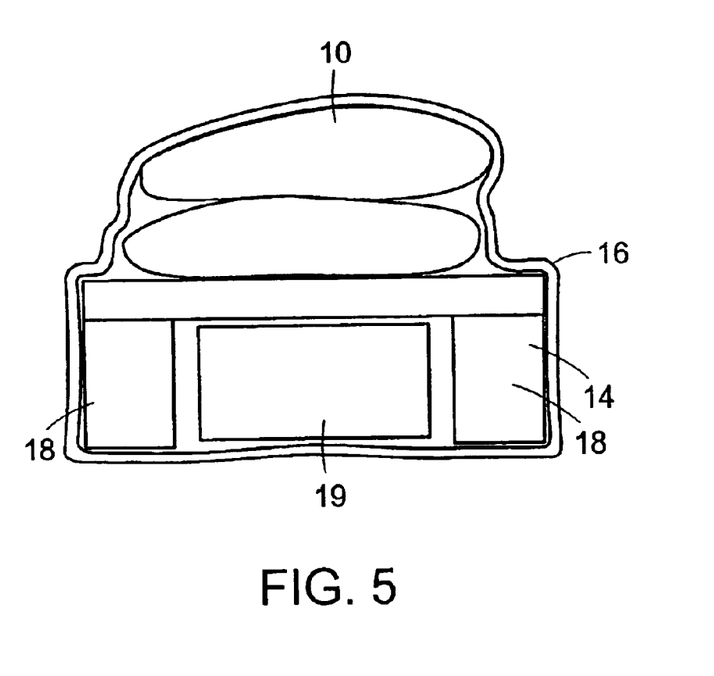
FIG. 5 is a cross-sectional view of the pallet shown in FIG. 4 having material provided between the support members of the pallet.

In a particular embodiment, if a vacuum is applied to the hermetic container 16, the gaps in between the pallets 14 can optionally be filled to prevent the container from ripping or the skid from breaking, as shown in box 35. More particularly, it is desirable to prevent the container 16 from being stretched and potentially broken as illustrated in FIG. 4. As shown in FIG. 5, the gaps between the support members 18 of the pallet 14 can be filled with a material 19, such as wood, to prevent the container 16 from being stretched and potentially broken.

As an alternative to the simply sealed hermetic container 16 described above or with the vacuum, the hermetic container 16 can be purged with a gas other than air to reduce the amount of breathable air required to sustain life in an air breathing species to create a substantially hypoxic atmosphere to both reduce the specific time period to kill substantially all of the insects that have infested the commodity 10 prior to placement in the flexible hermetic container 16 and, in addition where required, to protect the commodity from oxidation. The purging gas can include carbon dioxide or nitrogen. This method is also a feasible pesticide-free fumigation alternative, and may be preferable in the case of crushable commodities, such as dates, figs, and other fruits, which otherwise need to be protected from crushing by means of a protective cage inside the flexible hermetic container.

In alternative embodiments, it has been discovered that the time required to kill substantially all of the insects in a hermetic container 16 to which a vacuum has been applied can be substantially reduced by adding a small amount of pesticide into the container. For example, by adding ⅛ to ⅙ of the amount of propylene oxide normally required to kill substantially all of the insects without a vacuum to a hermetic container 16 to which a vacuum has been applied, the kill time is reduced by a large factor.

After the commodity 10, such as grain, cocoa, or coffee, has been stored for at least the specific minimum time to kill substantially all the insects, the commodity is ready for the transportation phase, when desired. In one embodiment, the commodity is stored at a given temperature, with substantially all portions of the commodity being at the temperature, to ensure substantial total kill within a desired maximum time period. Generally, the higher the commodity temperature, the faster the kill time. For example, the commodity can be stored in a heated warehouse to decrease the time period needed to kill substantially all of the insects.

Figure 6:
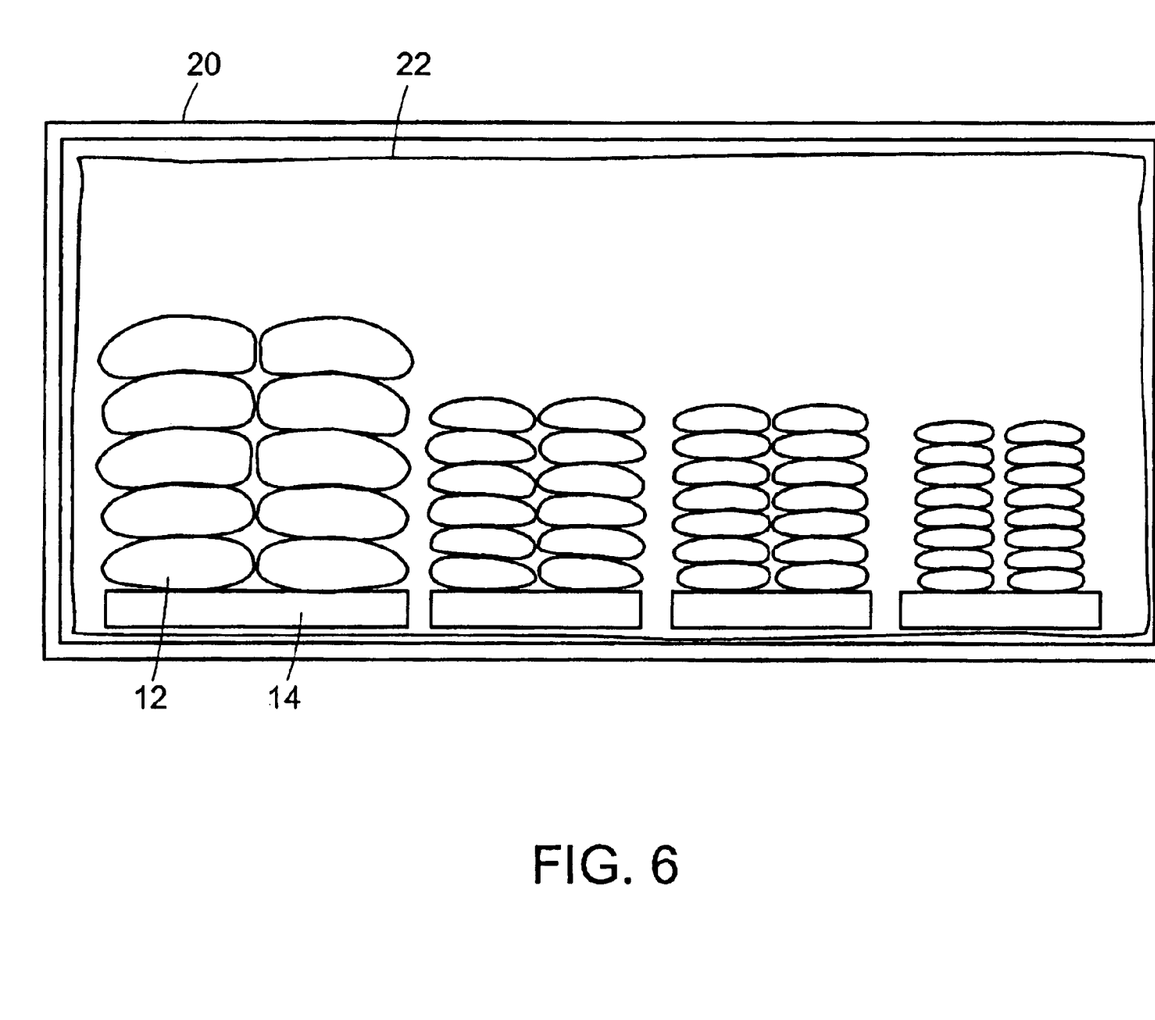
FIG. 6 is a cross-sectional view of a shipping container with an insect barrier.

In one embodiment, as shown in box 40, the skid mounted bags of the commodity are moved from the hermetic containers 16 to inside of a shipping container 20, seen in FIG. 6. In one embodiment, the shipping container 20 is a standard 20 ft. shipping container or equivalent. It is recognized that the skids or pallets 14 are sized to maximize the number of skids 14 accepted by the shipping container 20 with the minimal wasted space. Dependent on the equipment/facilities at the location the shipping container 20 is loaded, a forklift can be used to move the skids 14 carrying the bags 12 full of the commodity 10. If there is no forklift available, bags can be manually placed inside such a shipping container 20, or rolled manually from a loading dolly or skid using rollers, or similar friction-reducing device.

The shipping container 20 as seen in FIG. 6 has an insect barrier or liner 22 such as a thin plastic liner. The liner 22 can be attached to the container 20 so that the liner 22 generally conforms to the inner shape of the container 20. In a particular embodiment, the insect-proof barrier low air-permeable liner 22 is formed from a polymeric material, such as polypropylene, and has a thickness in the range of about 0.0762 to 0.0381 mm (0.003 to 0.015 inches). In an alternative shown in box 38, the liner 22 is blown open at one end for loading by means of a modest-volume fan at the entrance, without interfering with loading. Such a fan needs to provide over-pressures as little as 1 mm of water-column pressure. As shown in box 42, when the shipping container 20 is filly loaded, the liner 22 can be sealed shut. In one alternative, the shipping container 20 can be made insect-tight by sealing the container itself. The shipping container is then shipped to the destination (box 44).

If it is desired to have a hermetic seal during transportation in the storage container, a low air-permeable plastic liner can used in the shipping container 20. In one embodiment, the liner is a suitable polyethylene or polypropylene. The liner can be kept open for loading as described above. Likewise, if vacuum storage (low oxygen) is desired, even though no live insects remain, then a vacuum pump can maintain a vacuum at a constant level during transportation, or if the transportation phase is brief, a "low air-permeable" envelope can be used as a liner, or as a skid wrap for each skid. In the context of a hermetic container, low air-permeable can be defined as low air-permeability through the container compared to the initial consumption of air by the infesting insects or the commodity itself. If a vacuum is used, low air-permeable can be defined as low air permeability through the container compared to the pumping capability of the vacuum pump at a designated pressure. In one embodiment, the container 16 is formed from PVC and is 15 m$^3$ with a ten metric ton capacity, and has an infiltration rate of less than about 10 liters/minute at 40 mm Hg.

The use of hermetic containers, such as the hermetically-sealed, flexible PVC enclosures marketed by GrainPro, Inc. of Concord, Mass. under the trade name Cocoons™, can cause a complete kill of infesting insects, without the use of pesticides. In some cases, this requires the use of a vacuum or an artificially-induced atmosphere, such as nitrogen or carbon dioxide.

When the shipping container 20 arrives at its destination in the importing country with the skids 14 of bags 12 of the commodity 10, the next step typically depends on the time frame until the commodity is to be processed or used. The skids 14 can be stored in the shipping container 20 with the insect barrier liner 22 (box 46). In one alternative, and typical when the commodity is going to be stored for a prolonged time period (typically multiple weeks), the skidded mounted bags 12 are taken out of the shipping container 20 and put into a storage hermetic container 16 (box 48). Depending on the need, the hermetic container 16 can either be merely hermetically sealed, or could be evacuated. The commodity 10 is stored in the shipping container 20 until needed, as shown in box 50.

While it is preferred to process the commodity 10 as soon as possible to make the commodity substantially insect free (i.e., the commodity 10 contains no living insects) it is recognized that skidded bags 12 arriving without having gone through the previous pre-shipment storage process can be "treated" without fumigants by storage in the hermetic container 16. Likewise, it is recognized that a vacuum can be drawn on the hermetic container or the container 16 purged using carbon dioxide or nitrogen as described above.

Figure 7:
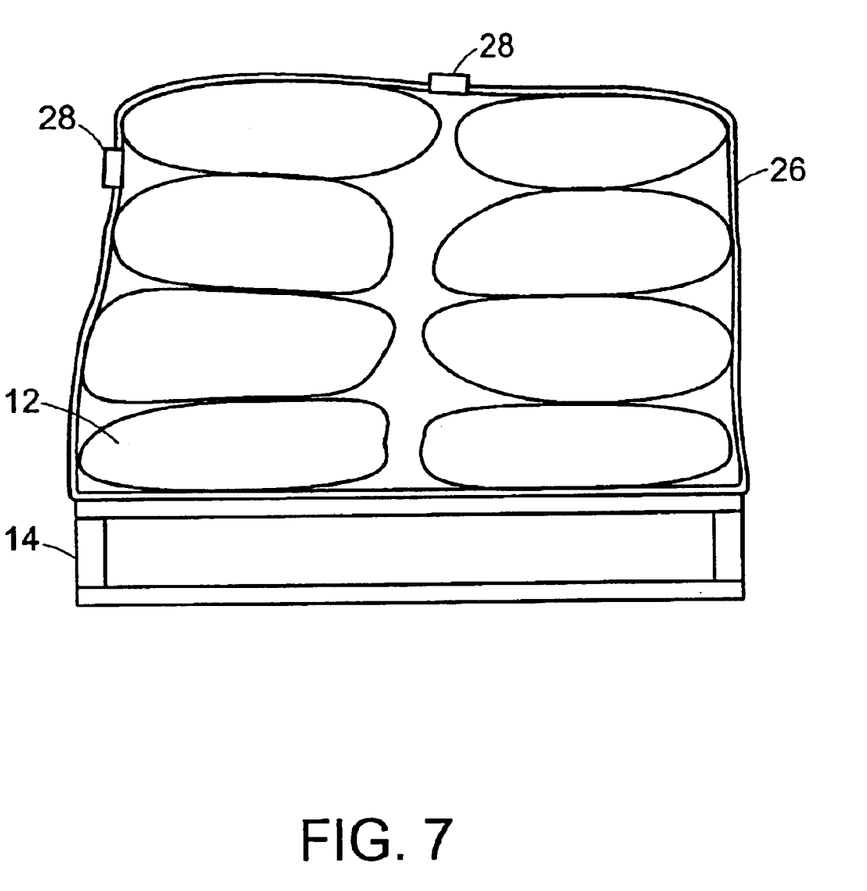
FIG. 7 is a cross-sectional side view of a skid with a plurality of bags sealed in an insect barrier.

An alternative to placing a plurality of skids 14 of bags 12 of commodity 10 into a shipping container 20 with an insect barrier liner 22 is to stack the bags 12 of the selected commodity 10 on skids 14 and each skid 14 with its set of bags 12 are sealed in an enclosing insect-barrier 26, such as shrink wrap, as seen in FIG. 7. In one embodiment, the bags 12 on the skids 14 are placed in the enclosing insect barrier 26 prior to placement in the hermetic container 16 for pre-shipment storage phase. If the selected commodity 10 is to be exposed to a vacuum, the enclosing insect barrier 26 has venting apertures 28 which are sealed prior to placement in the shipping container 20.

Figure 8:
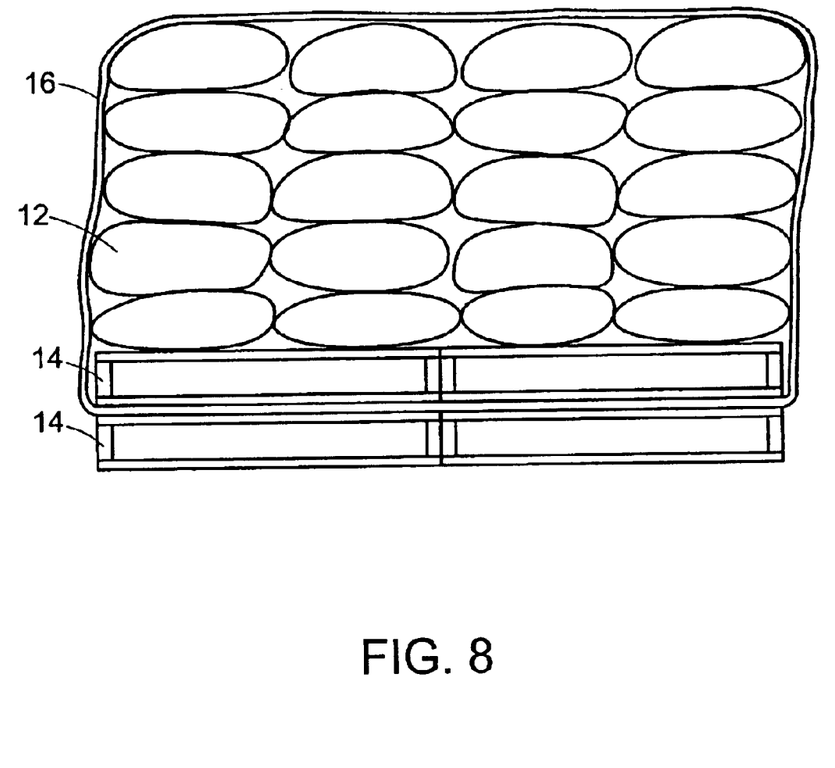
FIG. 8 is a cross-sectional view of a skidded hermetic container.

Another alternative is to have the bags 12 of the selected commodities 10 transported inside hermetic containers 16 which have in turn been mounted on and where desired, strapped down to pallets, or skids, as seen in FIG. 8. In alternative embodiments, the hermetic containers 16 can be evacuated as disclosed above. To facilitate filling the hermetic containers 16 with commodities pre-mounted on skids 14 using forklifts to load, the exact size of the hermetic container 16 can be selected to match, and the hermetic container 16 can be provided with some protective surface on the bottom to prevent damage to the hermetic container 16 by the forklift and skid during insertion and removal. Inserting the commodity-laden skid(s) inside the shipping container 20, such as a 20 foot container, can either be done by roller or ball conveyers, as in aircraft, or by putting rollers or casters on the skids themselves, or other common means of providing a low-friction contact.

While this invention has been particularly shown and described with references to preferred embodiments thereof, it will be understood by those skilled in the art that various changes in form and details maybe made therein without departing from the scope of the invention encompassed by the appended claims.

What is claimed is:

1. A method of storing and transporting a commodity comprising:
    placing the commodity onto at least one skid;
    moving the at least one skid having the commodity thereon into a first flexible hermetic container;
    storing the commodity in the first flexible hermetic container for at least a specific time period;
    disinfesting the commodity while the commodity is in the first flexible hermetic container;
    moving the commodity stored inside the first flexible hermetic container to a substantially rodent-proof standard shipping container wherein moving the commodity includes removing the skid having the commodity thereon from the first flexible hermetic container and placing the skid having the commodity thereon into the shipping container; and
    transporting the shipping container with the commodity, wherein the method is done while minimizing manual handling and loading of said commodity.

2. The method of claim 1 wherein placing the commodity onto at least one skid includes placing the commodity onto a plurality of skids.

3. The method of claim 1 further comprising providing at least one insect-proof barrier to protect the commodity within the shipping container from insects.

4. The method of claim 1 further comprising providing at least one hermetic barrier around at least some of the commodity in the shipping container, wherein said providing does not necessitate premodification of the shipping container.

5. The method of claim 1 wherein the specific time period is a sufficient time period to kill substantially all of the insects that have infested the commodity prior to placement in the first flexible hermetic container, and wherein the storing for a specific time period results in the disinfesting of the commodity.

6. The method of claim 5 wherein the disinfesting further comprises drawing a vacuum on the first flexible hermetic container to remove substantially all of the air within the first flexible hermetic container.

7. The method of claim 5 wherein the disinfesting further comprises injecting a pesticide into the first flexible hermetic container to accelerate a killing effect.

8. The method of claim 5 wherein the disinfesting further comprises reducing the amount of breathable air required to sustain life in an air breathing species to both reduce the specific time period to kill substantially all of the insects that have infested the commodity prior to placement in the flexible hermetic container and protect the commodity from oxidation.

9. The method of claim 8 wherein the reducing is done by purging with carbon dioxide.

10. The method of claim 8 wherein the reducing is done by purging with nitrogen.

11. The method of claim 1 further comprising placing the commodity in a plurality of flexible bags protected by one or more insect resistant membranes prior to placing the commodity onto the skid, wherein said membranes comprise venting apertures which are closed prior to placement in the shipping container.

12. The method of claim 1 further comprising providing a liner within the shipping container, the liner being an air-permeable insect barrier that encloses at least some of the commodity.

13. The method of claim 1 further comprising providing a liner within the shipping container, the liner being a low-permeable insect barrier that encloses at least some of the commodity.

14. The method of claim 1 further comprising providing a liner within the shipping container and blowing a relatively low amount of air into the liner to facilitate loading of the commodity into the liner of the shipping container and without interfering with said loading.

15. The method of claim 1 further comprising:
    moving the commodity from the shipping container to a second flexible hermetic container; and
    storing the commodity in the second flexible hermetic container.

16. The method of claim 15 further comprising providing an insect barrier liner within the second flexible hermetic container that encloses at least some of the commodity.

17. The method of claim 16 further comprising drawing a vacuum on the second flexible hermetic container to remove substantially all of the air within the second flexible hermetic container.

18. The method of claim 15 further comprising reducing the amount of breathable air required to sustain life in an air breathing species to both reduce the specific time period to kill substantially all of the insects that have infested the commodity prior to placement in the flexible hermetic container and protect the commodity from oxidation.

19. The method of claim 1 further comprising storing the commodity in the shipping container.

20. The method of claim 1 further comprising wrapping the contents of each skid in at least one flexible insect barrier, said barrier comprising venting apertures which are closed prior to placement in the shipping container.

21. The method of claim 1 further comprising maintaining a temperature sufficiently high within substantially all portions of the commodity to ensure substantial total kill of all infesting insects within a desired maximum time period.

22. A substantially pesticide-free integrated transport and storage system for a commodity comprising:
    at least one commodity container for receiving the commodity;
    a flexible hermetic container capable of directly accepting and storing the commodity contained in the at least one commodity container for at least a specific period of time;
    a rigid container defining a volume to receive the commodity container with the commodity therein, the rigid container being substantially rodent-proof; and
    at least one insect-proof barrier within the rigid container enclosing at least some of the commodity, wherein the barrier comprises means for exposing said commodity to a vacuum while maintaining a seal on said commodity.

23. The system of claim 22 wherein the barrier includes a low air-permeable insect-proof barrier.

24. The system of claim 22 wherein the at least one commodity container includes a jute bag.

25. The system of claim 22 further comprising a plurality of skids, each skid carrying a plurality of flexible bags, each bag containing at least some of the commodity.

26. The system of claim 25 further comprising a flexible insect barrier encircling the flexible bags of each skid.

27. The system of claim 22 wherein the insect-proof barrier is the flexible hermetic container.

28. The system of claim 22 wherein the barrier includes a liner having a thickness in the range of about 0.0762 to 0.381 mm (0.003 to 0.015 inches).

29. The system of claim 22 wherein the barrier includes a liner, further comprising a device for blowing air into the liner to facilitate the loading of the commodity into the liner.

30. The system of claim 22 further comprising a significantly reduced amount of pesticide that can be injected into the flexible hermetic container to accelerate killing of pests within the commodity.

* * * * *